United States Patent [19]

Mijnders

[11] Patent Number: 4,815,264
[45] Date of Patent: Mar. 28, 1989

[54] MOWING DEVICE WITH IMPROVED DISC CONFIGURATION AND BLADE ATTACHMENT

[75] Inventor: Gijsbert J. Mijnders, Nieuw-Vennep, Netherlands

[73] Assignee: Multinorm B.V., Netherlands

[21] Appl. No.: 43,415

[22] Filed: Apr. 28, 1987

[30] Foreign Application Priority Data

Apr. 29, 1986 [NL] Netherlands ............... 8601110

[51] Int. Cl.$^4$ ............................................. A01D 34/66
[52] U.S. Cl. ............................................. 56/295; 56/136
[58] Field of Search ............ 56/295, 136, 192, 6, 56/7; 408/710

[56] References Cited

U.S. PATENT DOCUMENTS

| | | | |
|---|---|---|---|
| 3,321,894 | 5/1967 | Ingram | 56/295 |
| 3,398,517 | 8/1968 | Freedlander | 56/295 |
| 3,507,104 | 4/1970 | Kline et al. | 56/295 |
| 3,555,798 | 1/1971 | Eder | 56/295 |
| 3,570,229 | 3/1971 | Freedlander | 56/295 |
| 3,614,861 | 10/1971 | Wickham et al. | 56/295 |
| 3,683,606 | 8/1972 | Staines | 56/295 |
| 3,911,652 | 10/1975 | Houle | 56/295 |
| 3,918,241 | 11/1975 | Stillions | 56/295 |
| 4,183,196 | 1/1980 | Oosterling et al. | 56/295 |
| 4,229,933 | 10/1980 | Bernard | 56/295 |
| 4,313,297 | 2/1982 | Maier | 56/295 |
| 4,471,603 | 9/1984 | Veltin, Jr. | 56/295 |
| 4,549,390 | 10/1985 | McLean | 56/295 |

*Primary Examiner*—Paul J. Hirsch
*Attorney, Agent, or Firm*—John P. Snyder

[57] ABSTRACT

The invention relates to a device for mowing agricultural crops, particularly grass, provided with an elongate mower bar pulled in transverse direction over the field and having a number of dish-like carriers having at least two upstanding pins, adapted to be attached with respect to the carrier, around each pin a cutter blade is releasably mounted for pivoting. The device according to the invention is distinguished in that the dish-like carrier is provided with a protruding arm for each pin, said arm having a front face, sloping up and backwards, with respect to the direction of rotation, said pin being arranged underneath and behind said front face.

13 Claims, 3 Drawing Sheets

MOWING DEVICE WITH IMPROVED DISC CONFIGURATION AND BLADE ATTACHMENT

The invention relates to a device for mowing agricultural crops, particularly grass, provided with an elongate mower bar pulled in transverse direction over the field and having a number of dish-like carriers having at least two upstanding pins, adapted to be attached with respect to the carrier, around each pin a cutter blade is releasably mounted for pivoting.

Such a device is known from the French publication No. 2.072.365, wherein the pin has the form of a bolt threaded into a nut attached to the lower side of the dishlike carrier, also called disc. The head of the bolt is received in an orifice of a protecting plate parallel to the top side of the disc. Although such a blade attachment is very simple, the drawback of this arrangement is that in case of damage to the nut the complete disc must be replaced and damage to the nut is likely as it is protruding underneath the disc.

The invention has for its object to obviate the above mentioned drawback by an improved blade attachment and disc configuration. The device according to the invention is distinguished in that the dish-like carrier is provided with a protruding arm for each pin, said arm having a front face, sloping up and backwards, with respect to the direction of rotation, said pin being arranged underneath and behind said front face.

Owing to the inclined position of the front face of the protruding arm of the disc a good disposal of the mould crop is obtained by reason of the generated upwardly directed air-flow. The low lying lower edge of the arms runs in its topmost position through the path of the cutter blade on the adjoining dish and therefor will not smash the crop but will guide it for a good crop disposal over the mower device.

According to a first embodiment of the invention the downward pointing pin is attached firmly to the dish and has an undercut which fits into an opening recessed into the cutter blade, whereby a locking member is arranged between blade holder and cutter blade.

Attachment of the blade is carried out by placing the recess of the cutter blade in the undercut, after the blade has first been inserted into the blade holder. In view of the fact that the blade holder turns on the pin there need only be a locking arranged between cutter blade and blade holder.

It is noticed that a downwardly pointing pin is known from the European publication No. 22588, said pin is attached to a separately spring mounted arm, which serves to enable removal and fitting of the cutter blade. The pin as disclosed herein is not fixedly attached to the dish.

In a preferred embodiment the blade holder takes the form of a closed tube, which is provided with two aligned holes for accomodating the pin. This effects a good mounting and support of the preferably thin cutter blade relative to the pin which results in less wear, particularly because the cutter blade is mounted on the top and bottom sides on the pin.

An exceptional locking member is obtained by a lip pressed out of the cutter blade, which lip co-operates with an opening in the blade holder. Changing the cutter blade is hereby considerably simplified, as the sliding movement into the blade holder compresses the lip and finally makes it hook into the opening of the blade holder. Visual checking is hereby simplified and the covered locking ensures the user of a secure operation of the mower.

According to a second embodiment of the invention the pin is formed like a bolt having a non-circular head, which can be passed through a non-circular hole in a fastening plate undernath the arm of the disc. A nut-like member cooperating with said bolt will clamp the bolt onto said plate, whereas the cutting blade can pivot around said nut-like member. Damage to the bolt and nut respectively just asks for a replacement of those parts and not for the disc itself.

In all the embodiments the sloping front face of the arm will protect the pin and blade attachment against wear, since the pin is sheltered behind said front face.

Finally the invention proposes to form the dish with the or each arm as one single mould part, for example of plastic, which lowers the cost price.

Above mentioned and other features of the invention will be further elucidated in the detailed description following hereafter of two embodiments.

Figure 1:
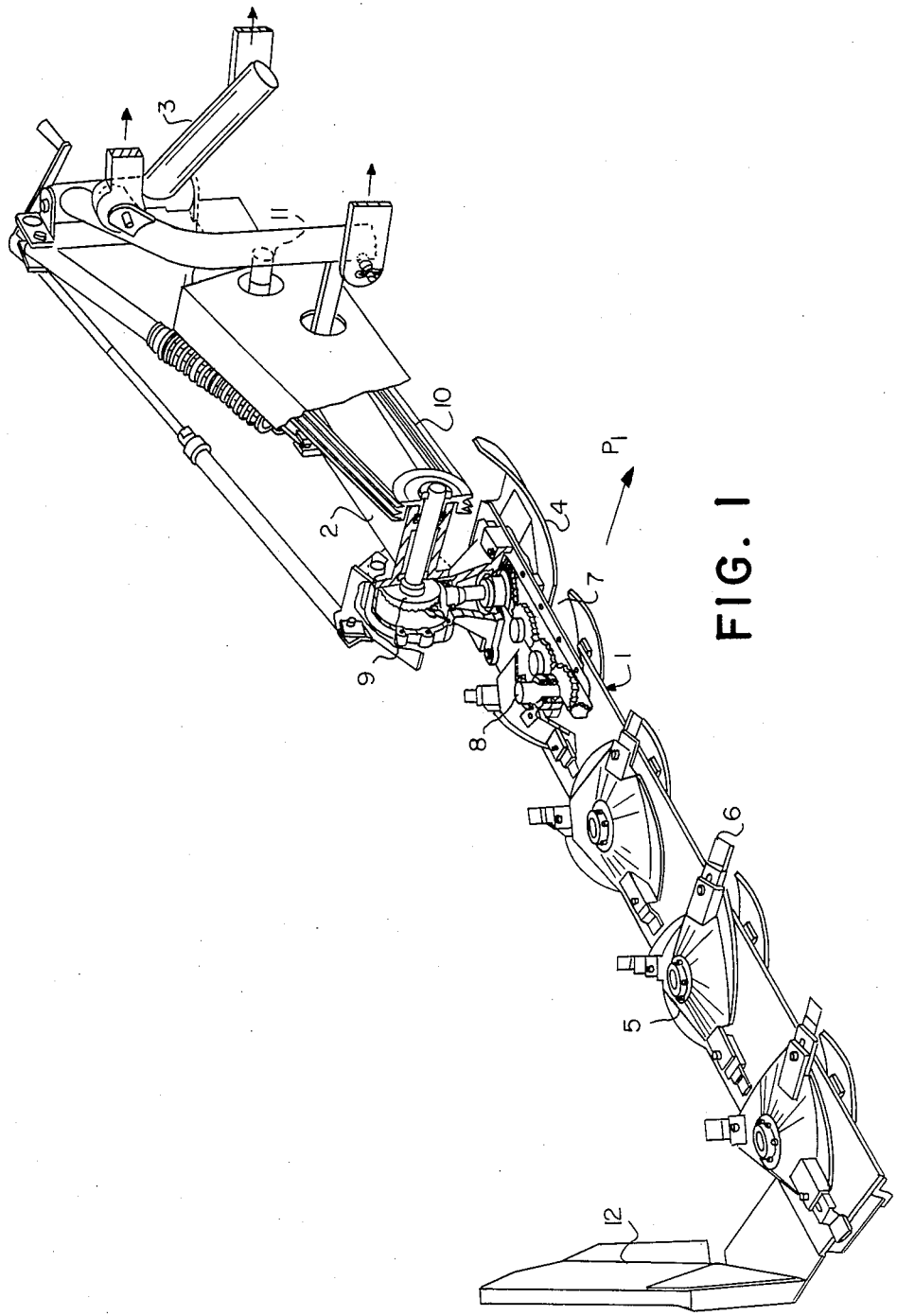
FIG. 1 shows a perspective top view of a mowing device provided with a mower bar having mower discs arranged thereon, each one provided with three cutter blades.

The device shown in FIG. 1 for mowing agricultural crops is of a known type and consists substantially of a mower bar 1 which is moved forward over the field in the direction of the arrow P1 transverse of the longitudinal direction of mower bar 1. This is made possible by attaching the mower bar at one of its ends to a supporting frame 2 which can be attached by means of a lifting frame 3 to for example the three-point suspension of an agricultural tractor (not shown).

Mower bar 1 is provided on the underside with slide shoes 4 which slide over the ground.

The mower bar is provided on the upper side with four dishes 5 which have a triangular form whereby at each angular point a mower cutter blade 6 is arranged for rotation.

Driving of discs 4 and cutter blades 6 is carried out by a gear wheel unit 7 accomodated in mower bar 1 which in each case drives a first upright shaft 8 for a mower disc 5.

The gear wheel unit 7 is set into rotation in a known manner by a transmission 9 which is actuated from the power take-off 11 through a system of ropes 10.

It is noted finally that the other end of the mower bar 1 is formed with a swath guide 12.

Figure 2:
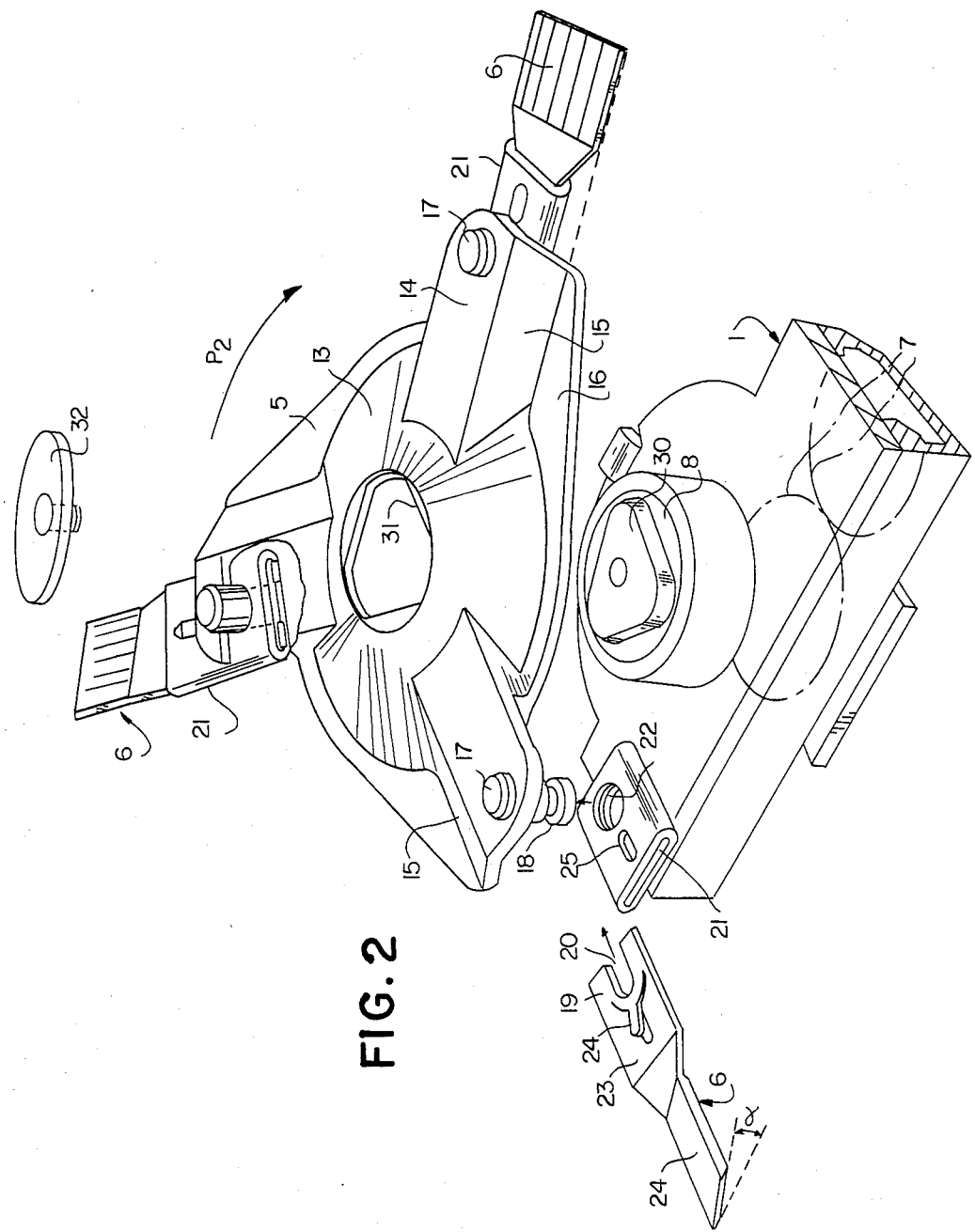
FIG. 2 shows a perspective top view of a part of the device from FIG. 1, whereby the parts are taken apart.

Essential features of the invention realted to the blade attachment and the form of the dish are now further elucidated with reference to FIG. 2.

In the embodiment shown, dish 5 has a central circular part 13 which carries three arms 14 distributed at regular intervals along the periphery, these arms protruding beyond the substantially circular part 13. The front face 15 of arm 14 facing the direction of rotation P2 is sloping back- and upwardly with respect to a lower lying flange edge 16 of central part 13.

Attached firmly to the underside of upper part 14 of the arm is a pin 17. The pin has an undercut 18 underneath arm 14, in which undercut fits the fork-shaped end 19 of cutter blade 6. The spacing between the forks on either side of recess 20 of the cutter blade is such that it corresponds to the diameter of undercut 18.

Cutter blade 6 is inserted into a closed tubular holder 21, this tubular holder 21 being provided with two aligned circular holes 22 lying one above the other, the diameter of which corresponds with that of the pin 17.

The part 23 of the cutter blade to be inserted into blade holder 21 is provided with a retaining lip 24 pressed out of the said part which co-operates with an opening 25 hollowed out of the upper or lower surface of blade holder 21.

It is remarked finally that cutter blade 6 contains an active part 6' that is twisted at a determined angle α relative to the part 23.

It is noted that the lower edge of the cutter blade in this embodiment lies at the same height as that of the inclining front surface 15 of arm 14, see on the right of FIG. 2.

Fitting of the cutter blade 6 is performed as follows. The user holds blade holder 21 firmly with the one hand and places it onto pin 17, making sure that the undercut 18 comes to lie between the upper and lower plates of holder 21. With the other hand he then inserts the part 23 of cutter blade 6 into the tube 21, whereby the fork 19 comes to lie round the undercut 18. He inserts the cutter blade up to the point where lip 24 falls into opening 25. This can be easily ascertained visually, see on the right side in FIG. 2. It is noted that the cutter blade can be inserted into blade holder 21 in one way only so that the cutting edge of the cutter blade always points in the right direction. The cutter blade can however be turned over 180° on its longitudinal axis, whereby the retaining lip will slot into the other retaining hole of the holder. Alternatively, the holder can be turned over. It will be apparent from the above that the blade attachment is not only simple in construction but that it is also secure.

The dish 5 can be attached to the vertical shaft 8 of mower bar 1 with or without cutter blade 6, since this vertical shaft 8 is formed with a triangular elevated portion 30. This elevated portion falls into a triangular recess 31 of dish 5, following which the dish can be fixed onto shaft 8 by means of a fastening bolt provided with a flange 32.

It will be apparent that the changing of cutter blades 6 can be performed while dish 5 is either fitted or detached.

The invention is not limited to the embodiment described above. The blade holder 21 can thus have not a closed form but an open C shape in order to achieve the same securing function for cutter blade 6. The recess 20 of the fork-shaped end can have a form other than that shown, depending on the form of the pin 17 employed.

Retaining lip 24 can be replaced by a separate retaining pin or spring.

Figure 3:
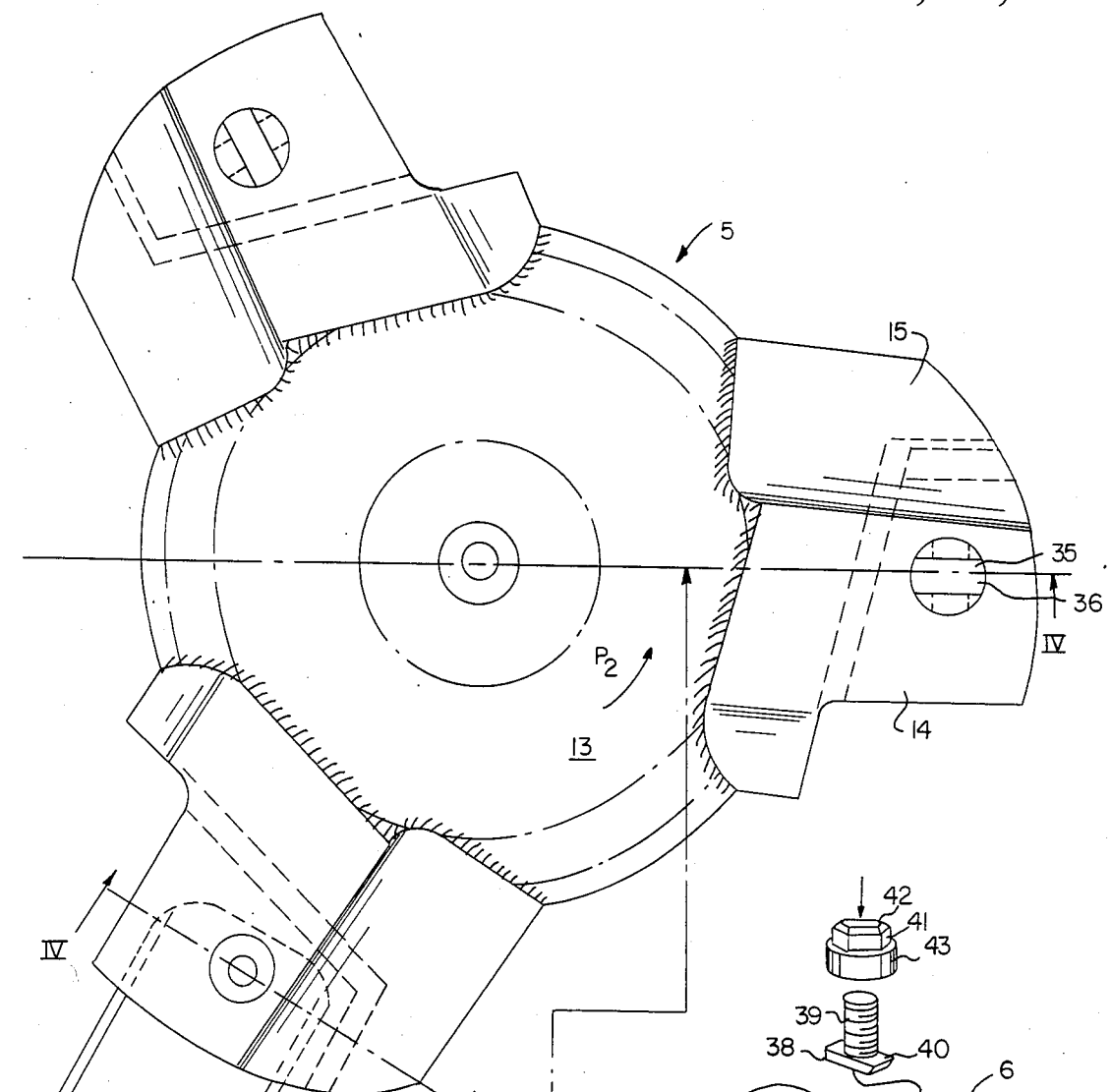
FIG. 3 shows a top view of a second embodiment of the dish-like carrier.
Figure 4:
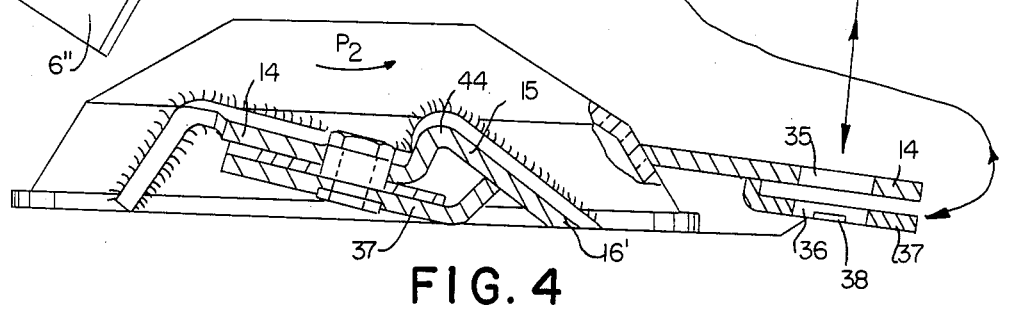
FIG. 4 shows a sectional view according to line IV—IV in FIG. 3, wherein the cutter blade is taken apart.

In the embodiment according to FIG. 3 and 4 the same reference numerals are used for the corresponding parts. Also here the dish 5 is provided with a central part 13 substantially being of circular form in top side view and further provided with three radially protruding arms 14. Said arm 14 is provided with a sloping front face 15, which runs from the lower edge 16' in upward and backwards manner with respect to the location of direction P2.

The top face of the arm 14 is provided with an orifice 35, in line with a non-circular hole 36 in a plate 37. The plate 37 extends parallelly underneath the arm 14 and behind the sloping front face 15, as is easily apparent from FIG. 4.

In between the lower plate 37 and the top surface of arm 14 the cutter blade 6 can be pivotably arranged since the backside of the plates 14, 37 are at a distance to each other.

To mounting the cutting blade 6 a bolt- and nut-structure is used. The bolt 38 has a threaded shank 39, and a hammer-like head 40. The circumference of said head corresponds with the circumference of the hole 36 in plate 37, such that the head can be passed through it.

The nut 41 has the hexagonal part 42, and a circular part 43. The circular part 43 fits into the orifice 35 of plate-arm 14 and into the hole 20' of cutter blade 6.

To mount or replace cutter blade 6 it is necessary to have the unit; nut—bolt; inserted through the overlying holes 35, 20' and 36 and to turn the bolt over 90° as soon as the hammer-head 40 is underneath plate 37. In this position the nut 41 will be turned, so as to clamp the head 40 under the plate 37 and the part 43 on top of the plate 37. In this manner the cutter blade 6 is easily fixed without further tools than a simple wrench tool. If desired the bottom face of plate 37 can be provided with a recession 38 for taking up the hammer head 40 of the bolt 38, in order to lock the bolt when turning the nut 41.

It is noticed that the top edge 44 of the sloping front face 15 lies higher than the part having the orifice 35 of arm 14, so bringing the attachment structure of the cutter blade 6 fully behind the front face 15, so avoiding unnecessary damage to the hammer head 40 of bolt 38 and nut 41 as well.

It is further noticed that the lower edge 16' of the front face 15 is on a lower or equal level as the active part 6" of cutter blade 6.

According to a further feature of the invention the cutter blade 6 is manufactured from a relatively thin plate material 45, which is embedded in a body 46 of material having a lower wear resistency. The cutter blade is therefor easy to handle but is still self-sharpening without the need to grind of the cutter edge itself.

The invention is not limited to the above described embodiments.

I claim:

1. A device for mowing agricultural crops, comprising an elongate mower bar having a plurality of dish-like carriers rotatably mounted on the mower bar in spaced relation along its length, drive means carried by the mower bar and including a plurality of upright drive shafts, one for each carrier, protruding upwardly from the upper surface of the mower bar for rotating a respective carrier about its center, each carrier having at least two circumferentially spaced arms protruding radially therefrom, each arm having an upper surface and a front face sloping upwardly and rearwardly to the upper surface, with respect to the direction of rotation of the respective carrier, so that the front face leads the upper surface, each upper surface having an opening and a pin received in such opening in downwardly projecting fashion, a cutter blade pivotally received on each pin and having a radially protruding cutting blade portion presenting a lower cutting edge at about the height of the lower edges of the front faces of the arms and sloping rearwardly and upwardly therefrom so that each pin lies behind and is protected by the front face of its associated arm.

2. A device as defined in claim 1 wherein each arm carries a blade holder through which an associated pin projects, each pin having an undercut portion disposed below the upper surface and each cutter blade having an opening receiving an associated pin, and locking means for locking each cutter blade to its associated blade holder.

3. A device as defined in claim claim 2 wherein each blade holder is in the form of a flattened tube receiving an inner end of as associated cutter blade.

4. A device as defined in claim 3 wherein the locking means comprises a lip struck out of an associated inner end of a cutter blade and each blade holder includes an opening receiving an associated lip.

5. A device as defined in claim 1 wherein each arm includes a lower plate disposed in spaced relation below its associated upper surface and defining a radial slot therewith, each associated pin projecting through both the upper surface and the lower plate.

6. A device as defined in claim 5 wherein each pin is provided with a non-circular head and each lower plate is provided with a non-circular opening receiving an associated head, and including a locking nut projecting through the opening in the associated upper surface.

7. A device as defined in claim 6 wherein each top surface lies at a level below the juncture of such top surface and its associated front face.

8. A device as defined in claim 1 wherein each cutter blade is in the form of a thin plate having an unsharpened cutting edge.

9. A device as defined in claim 8 wherein each cutter blade includes a main body portion of one material and a wear-resistant blade element embedded therein.

10. A device as defined in claim 9 wherein the one material is a synthetic resin.

11. A device as defined in claim 1 wherein each cutter blade includes an inner portion and an outer portion defining the radially protruding cutting blade portion, the outer portion being twisted relative to the inner portion.

12. A device as defined in claim 1 wherein each carrier is an integral construction.

13. A device for mowing agricultural crops, comprising an elongate mower bar having a plurality of dishlike carriers rotatably mounted on the mower bar in spaced relation along its length, drive means carried by the mower bar and including a plurality of upright drive shafts, one for each carrier, protruding upwardly from the upper surface of the mower bar for rotating a respective carrier about its center, each carrier having a part-peripheral horizontal flange portion and at least two circumferentially spaced arms protruding radially therefrom, adjacent carriers being spaced apart by an amount such that the part-peripheral horizontal flange portions are radially spaced and non-overlapped by the arms of an adjacent carrier, each arm having an upper surface and a front face sloping upwardly and rearwardly to the upper surface, with respect to the direction of rotation of the respective carrier, so that the front face leads the upper surface, each upper surface having an opening and a pin received in such opening in downwardly projecting fashion, a cutter blade pivotally received on each pin and having a radially protruding cutting blade portion presenting a lower cutting edge at about the height of the lower edges of the front faces of the arms and sloping rearwardly and upwardly therefrom, the radial protrusions of adjacent cutting blade portions being such that such cutting blade portions sweep circular paths which are overlapping so that crop cut by the cutting blade portion of one carrier is lifted by air swept upwardly by the sloping front faces of both carriers to clear the cutting blade portion of the adjacent carrier.

* * * * *